Dec. 4, 1962  C. L. REED, JR  3,066,909
PLUG VALVE

Filed Oct. 26, 1959  2 Sheets-Sheet 1

INVENTOR.
CHARLES L. REED, JR.
BY
J. Warren Kinney, Jr.
ATTORNEY

Dec. 4, 1962  C. L. REED, JR  3,066,909
PLUG VALVE
Filed Oct. 26, 1959  2 Sheets-Sheet 2
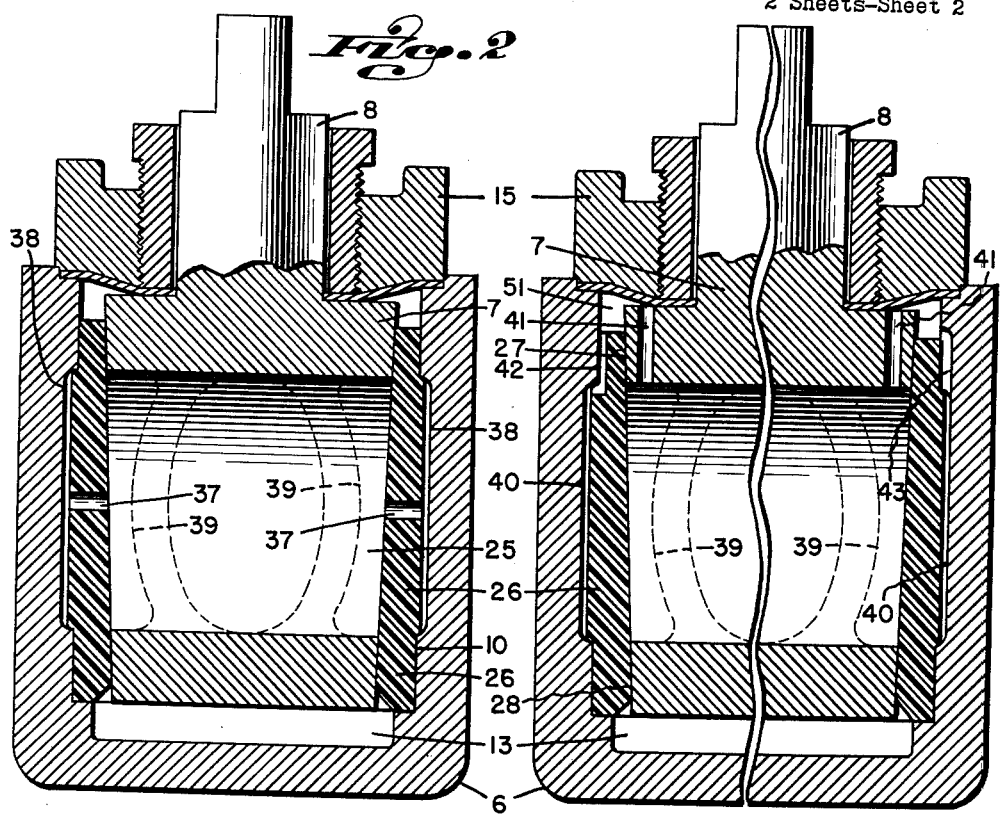
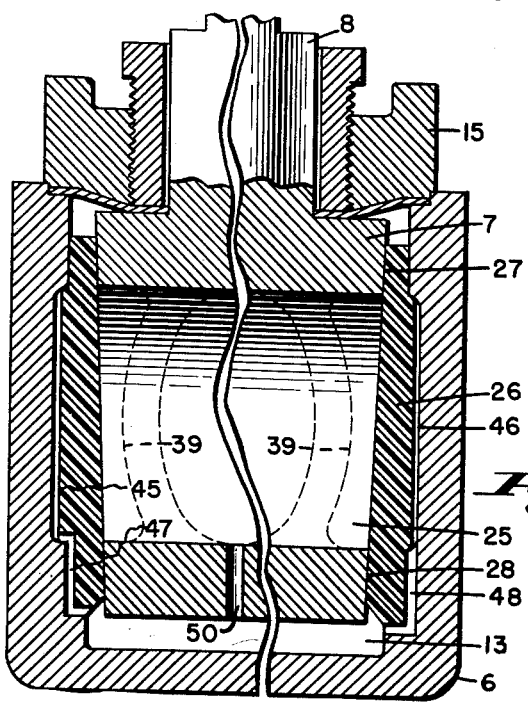
INVENTOR.
CHARLES L. REED, JR.
BY
J. Warren Kinney, Jr.
ATTORNEY

United States Patent Office 3,066,909
Patented Dec. 4, 1962

3,066,909
PLUG VALVE
Charles L. Reed, Jr., Cincinnati, Ohio, assignor to Continental Manufacturing Company, Cincinnati, Ohio, a corporation of Ohio
Filed Oct. 26, 1959, Ser. No. 848,835
11 Claims. (Cl. 251—309)

This invention relates to improvements in a plug valve of the type incorporating a non-metallic sleeve or liner in the plug bore of the valve body, and within which the plug rotates to open and closed positions; this form of valve being adapted particularly for the control of corrosive gases or liquids.

A primary object of the invention is to provide simple yet highly effective means to equalize the pressure between the port cavity of a rotatable plug and the relief areas between the liner sleeve and the valve body when the plug is in a closed or intermediate position.

Heretofore considerable difficulty has been encountered in the operation of lined plug valves because the pressure media, particularly gas, would accumulate between the sleeve and valve body and cause the sleeve to bulge outwardly away from the valve body into the port cavity of the valve when closed, with the result that rotation of the plug will cause the interfering portion of the sleeve to be sheared off.

Heretofore considerable difficulty has also been encountered in the operation of sleeve lined plug valves in those instances in which they were subjected to wide variations in temperature, or temperature cycling. The sleeves of valves which are subjected to temperature cycling are caused to bulge outwardly, with the result that they will be sheared incident to operation of the plug.

The present invention effectively eliminates both of the above difficulties which are inherent in sleeve lined plug valves.

Another object of the invention is to provide means in a sleeve-lined plug valve to impart to the valve a maximum of insurance against leakage and undue wearing of the parts, thereby enhancing the serviceability and efficiency of the valve.

Still another object of the invention is to provide structural improvements in a valve of the character stated, resulting in a substantial extension of the trouble-free service period of the valve.

A further object is to minimize the torque force required for manipulating the valve plug, so that a smooth and effortless action of the valve is assured.

Another object of the invention is to provide simply and inexpensively for balancing the pressure of fluid acting upon the sleeve or liner of the valve, for attainment of the objectives stated.

The foregoing and other objects are attained by the means described herein and illustrated upon the accompanying drawings, in which:

FIG. 2 is a transverse cross-sectional view of a valve similar to that of FIG. 1, but showing a modification thereof.

FIG. 3 is a transverse cross-section of a valve similar to that of FIG. 2, but showing a second modification.

FIG. 4 is a view similar to FIG. 2, but indicating a slight modification thereof.

Figure 1:
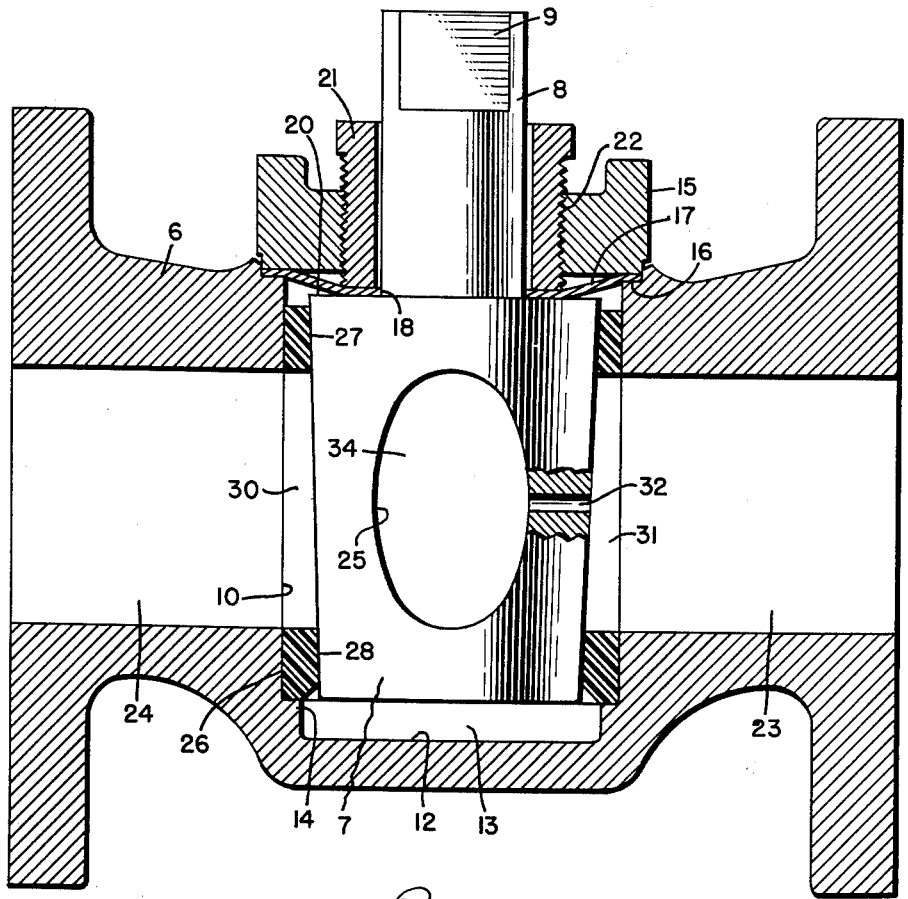
FIG. 1 is a longitudinal cross-sectional view of a plug-type valve embodying the improvements of the present invention, the valve being shown in closed condition.

Valves of the general character herein disclosed, and incorporating sleeves or liners in which the plugs rotate, find application usually under adverse conditions of usage involving the presence of corrosive liquids or gases. The sleeves or liners are often necessarily formed of non-metallic substances which lack rigidity or stiffness, such as certain plastics, which are subject to various degrees of deformation under the high pressure of fluid controlled by the valve. When deformation occurs, the valve plug becomes difficult to rotate, leakage ensues, and the sleeve or liner becomes subject to rapid destruction.

Although the sleeve or liner may be fabricated from various rigid materials such as Monel, copper, brass and the like, it is possible and sometimes preferable to employ certain flexible or resilient materials like rubber or synthetic plastics. The sleeves by preference are formed of a material characterized by resilience and elasticity, so as to be deformable under pressure within the valve. The material should also be of a slippery nature, having a low coefficient of friction and, when subjected to solvents and corrosive substances, it should display inertness and resistance to corrosion. It should also be usable over wide temperature and pressure ranges.

I have obtained uniformly satisfactory results in those instances wherein the sleeves have been fabricated from materials of the polyethylene group, particularly the halogenated ethylenes which are characterized by outstanding resistance to corrosives and solvents and which have extremely low coefficients of friction.

Polytetrafluoroethylene (Teflon) is such a material from which I have fabricated sleeves and other parts of the valves, with excellent results.

Referring now to the drawings, FIG. 1, a typical valve body is indicated at 6 and made preferably of a corrosion-resistive metal or alloy. The rotative plug for the valve is shown at 7, and has a stem 8 provided with a head 9 to receive a suitable implement for rotating the plug to open and closed positions. The valve plug is shown tapered, in accordance with common practice in the art.

The chamber for the plug may be a bore 10 extending transversely of the body, and terminating in a bottom wall 12 providing a relief cavity 13 beneath the plug. The cavity 13 may be in the form of a counterbore of lesser diameter than bore 10, thereby to provide an annular shoulder 14 at the lower limit of the bore. The plug may be restrained against separation from the valve body by means of a bonnet 15 suitably secured upon the valve body, to seat within an annular recess 16. The recess accommodates also the peripheral outer edge of a disc 17, of impervious material, suitable to seal the plug against leakage of fluid from the valve body interior. Disc 17 may have a central aperture 18 through which the stem 8 projects, the margin of said aperture being held in fluid-tight contact upon the upper face 20 of the plug by means of a gland member 21 threadedly associated with the bonnet as at 22.

The bonnet 15 may be detachably mounted upon the valve body in any approved manner commonly employed for the purpose. Removal of the bonnet affords ready access to the valve plug and the sleeve member upon which it seats, as will be explained.

In the valve illustrated, 23 indicates the upstream or pressure port of the valve body, whereas 24 indicates the downstream or outlet port thereof, the flow of fluid under pressure being from right to left. The plug 7 is provided with the usual transverse opening or port cavity 25, which may be placed in register with both ports 23 and 24 by rotating the plug a quarter turn. As shown in FIG. 1, the plug port opening 25 is out of registry with the body ports, and the valve therefore is closed.

The seat member for the valve plug is indicated generally by the character 26, and is constituted of a hollow sleeve molded or otherwise shaped from a mass of plastic substance, preferably Teflon, as above identified. The sleeve has an uninterrupted or continuous annular inner bearing face 27 surrounding the upper marginal portion of the plug, forming a fluid-tight seat about the plug. Similarly, at its lower end portion, the sleeve has a continuous annular inner bearing face 28 to seal all around the lower marginal portion of the plug. Intermediate the bearing faces 27 and 28, the sleeve is transversely apertured at 30 and 31 in correspondency with ports 23 and 24, to permit flow of fluid through the valve when the plug is rotated to open position. The taper of the sleeve interior, as indicated upon the drawing, corresponds to the taper of the plug.

Attention is now directed to a vent 32 formed in the plug transversely of the flow opening 25, the vent being exposed to the pressure side or port 23 when the valve is closed. The purpose of the vent is to introduce pressure of fluid to the inside areas of the flexible sleeve where said areas coincide with the plug opening 25 in the closed position of the valve. Pressure of fluid thereby imposed upon the sleeve areas 34 at the plug opening, serves to preclude inward distention of the sleeve material at the opposite ends of plug opening 25, so that when the plug is rotated from the closed position, there will be no tendency for the edges of the plug opening to shear off or tear the material of the sleeve, or to induce dislocation of the sleeve within the bore 10.

It may be here noted that sleeve 26 may be made in one piece, as disclosed in the Deas Sinkler patent application Serial No. 628,039 filed December 13, 1956, or in sections, as disclosed in my co-pending application Serial No. 759,010, filed September 4, 1958 now Patent Number 2,994,504. In either case, the improvements of the present invention are applicable.

The modification illustrated by FIG. 2 shows how the flexible sleeve 26 may be relieved to balance the pressure which may build up behind it, without venting the plug. In this modification, the sleeve is provided with a pair of opposed vents 37—37 so located as to register with the plug opening or cavity 25 when the valve is closed. The inside wall of the valve body, that is, the bore 10 is preferably deepened or recessed as at 38 part way around the bore, to provide a clearance space part way about the middle portion of the sleeve, between the upper and lower bearing faces 27 and 28. This clearance space, duplicated at opposite diameters of the sleeve, relieves into the plug cavity 25 through vents 37 upon each closing movement of the valve plug, to balance the pressure at the inside and outside surfaces of the cylindrical sleeve, thereby to avoid sleeve distortion.

The broken lines 39—39 indicate the extent to which the clearance spaces 38—38 at opposite sides of the valve body, approach the upstream and downstream ports of the valve, and define the outer periphery of high pressure sealing areas between the sleeve and valve body.

In the modification of FIG. 3, the bore 10 is deepened or recessed at 40—40, the same as in FIG. 2, but here the vents 41—41 are formed in the plug through the top thereof. The vents in this case relieve the pressure in clearance spaces 40—40 by way of channels 42—43 and upper body cavity 51, which place the clearance spaces in fluid communication with the vents and the plug cavity 25. It may be noted that channel 42 is formed in the material of the sleeve exteriorly of its bearing face 27, whereas channel 43 is formed in the material of the valve body exteriorly of the bearing face, these different constructions constituting slight modifications. In both instances, the clearance spaces about diametrically opposite areas of the sleeve are vented to the plug cavity through vents in the plug.

In accordance with the FIG. 4 modification, pressure in the clearance spaces 45 and 46 behind the sleeve is relieved by way of channels 47 and 48 located near the lower end of the valve plug, rather than at the upper end as in FIG. 3. The channels may be formed in the material of the sleeve, as at 47, or in an alternative construction the channels may be formed in the material of the valve body, as at 48. Fluid communication between the clearance spaces 45 and 46, and the plug cavity 25, may be established by means of a vent 50 formed in the bottom of the plug, which is spaced from the lower cavity 13 of the valve bore.

As in all other forms of the invention previously disclosed, the construction of FIG. 4 assures a balance of pressure interiorly and exteriorly of the flexible or resilient sleeve 26 when the valve is closed. Distortion and possible damage to the sleeve are thereby effectively minimized to enhance the serviceability and efficiency of the valve. It may here be noted in connection with FIG. 4, that formation of channels 47 and 48 in either the sleeve 26 or the valve body, represents alternative constructions which would not both appear in the same valve ordinarily. The same applies to the alternative channel formation of FIG. 3.

In the light of the present disclosure, it will appear that the advantages attained by balancing the pressure upon the sleeve areas of the valve may be achieved in any plug valve construction wherein the sleeve is of flexible or resilient material of a plastic or rubber-like nature. The use of Teflon in the sleeve construction, however, produces a most acceptable valve characterized by maximum durability and care-free service throughout long periods of hard usage. Such a valve combines smooth and effortless operation with leak-proof qualities and effective resistance to wear and corrosion under the most adverse conditions of use. Moreover, the improvements specified may be attained without resort to complex and expensive production procedure.

From the foregoing, it will be noted that I have thus provided simple, inexpensive, yet highly efficient and effective means for quickly and positively equalizing the pressure on opposite sides of the sleeve when the plug is opened.

It is to be understood that various modifications and changes in the structural details of the valve may be made, within the scope of the appended claims, without departing from the spirit of the invention.

What is claimed is:

1. A plug valve comprising in combination, a valve body having inlet and outlet ports and an intermediate transverse plug receptive bore in communication with said ports, a deformable non-metallic sleeve in said bore having upper and lower annular bearing faces interiorly thereof, said sleeve being capable of being deformed under fluid pressure when in use by the accumulation of fluid between the sleeve and valve body, said sleeve having opposed apertures therein registering one with each body port, and solid areas in the sides of the sleeve intermediate the sleeve apertures, clearance spaces being continuously provided between the solid areas of the sleeve and the adjacent wall of the plug receptive bore, a valve plug rotatable in the sleeve and having upper and lower annular faces in fluid-tight sliding contact upon the bearing faces of the sleeve, a through cavity in the plug to register with the sleeve apertures and the body ports upon rotation of the plug, fluid passage means venting said plug cavity to the clearance spaces when the plug is in closed position.

2. A plug valve comprising in combination, a valve body having inlet and outlet ports and an intermediate transverse plug-receptive bore in communication with said ports, a deformable sleeve in said bore having upper and lower annular bearing faces interiorly thereof, said sleeve being capable of being deformed under fluid pressure when in use by the accumulation of fluid between the sleeve and valve body, said sleeve having opposed apertures therein registering one with each body port, and solid areas in the sides of the sleeve intermediate the sleeve apertures, said solid areas being spaced with slight clearance from the wall of the plug receptive bore, a valve plug rotatable in the sleeve and having upper and lower annular faces in fluid-tight sliding contact upon the bearing faces of the sleeve, the plug having a through cavity and a communicating vent formed therein, the through cavity being registrable with the sleeve apertures and the body ports upon rotation of the plug to open-valve position, and the plug vent being located to place the plug cavity and the clearance spaces of the sleeve in fluid communication with one another to thereby provide substantially equal fluid pressure therein.

3. A plug valve as set forth in claim 2, wherein the sleeve is of a material of the class of polytetrafluoroethylene.

4. A plug valve comprising in combination, a valve body having inlet and outlet ports and an intermediate transverse plug-receptive bore in communication with said ports, a deformable non-metallic sleeve of a material of the class of polytetrafluoroethylene disposed within said bore having upper and lower annular bearing faces interiorly thereof, said sleeve being capable of being deformed under fluid pressure when in use by the accumulation of fluid between the sleeve and valve body said sleeve having opposed apertures therein registering one with each body port, and solid areas in the sides of the sleeve intermediate the sleeve apertures, clearance spaces being continuously provided between the solid areas of the sleeve and the adjacent wall of the plug receptive bore, a valve plug rotatable in the sleeve and having upper and lower annular faces in fluid-tight sliding contact upon the bearing faces of the sleeve, a through cavity in the plug to register with the sleeve apertures and the body ports upon rotation of the plug, fluid passage means venting said plug cavity to the clearance spaces when the plug is in closed position.

5. A plug valve comprising in combination, a valve body having inlet and outlet ports and an intermediate transverse plug-receptive bore in communication with said ports, a deformable sleeve in said bore having upper and lower annular bearing faces interiorly thereof, said sleeve being capable of being deformed under fluid pressure when in use by the accumulation of fluid between the sleeve and valve body, said sleeve having opposed apertures therein registering one with each body port, and solid areas in the sides of the sleeve intermediate the sleeve apertures, said solid areas being continuously spaced with slight clearance from adjacent areas of the wall of the plug-receptive bore, and venting means in the sleeve placing said clearance spaces in fluid communication with the hollow interior of the sleeve, a valve plug rotatable in the sleeve and having upper and lower annular faces in fluid-tight sliding contact upon the bearing faces of the sleeve, the plug having a through cavity communicable selectively with the venting means of the sleeve, and with the sleeve apertures and body ports of the valve, upon rotation of the plug to closed and open valve positions, respectively.

6. A plug valve as set forth in claim 5, wherein the venting means of the sleeve is located in an outer wall of the sleeve near one end thereof, and additional venting means is provided through said valve plug to provide communication with the cavity therein.

7. A plug valve comprising in combination, a valve body having inlet and outlet ports and an intermediate transverse plug-receptive bore in communication with said ports, a deformable sleeve in said bore having upper and lower annular bearing faces interiorly thereof, said sleeve being capable of being deformed under fluid pressure when in use by the accumulation of fluid between the sleeve and valve body, said sleeve having opposed apertures therein registering one with each body port, and solid areas in the sides of the sleeve intermediate the sleeve apertures, said solid areas being continuously spaced with slight clearance from adjacent areas of the wall of the plug-receptive bore, a valve plug rotatable in the sleeve and having upper and lower annular faces in fluid-tight sliding contact upon the bearing faces of the sleeve, the plug having a through cavity communicable selectively with the vent means hereinafter recited, and with the sleeve apertures and body ports of the valve, upon rotation of the plug to closed and open valve positions, respectively, vent means including a channel formed in the bore of the valve body and vent means in said valve plug for placing said clearance spaces in fluid communication with the hollow interior of the sleeve.

8. A plug valve as set forth in claim 7, wherein the sleeve is of a material of the class of polytetrafluoroethylene.

9. A plug valve comprising in combination, a valve body having inlet and outlet ports and an intermediate transverse plug-receptive bore in communication with said ports, a deformable sleeve in said bore, said sleeve including solid areas between said ports continuously spaced from the wall of the bore to provide at least one clearance space, said sleeve being capable of being deformed under fluid pressure when in use by the accumulation of fluid between the sleeve and valve body, a valve plug rotatable in the sleeve and having formed therein a through cavity communicable selectively with the ports of the valve body, and means venting the clearance space aforesaid to the through cavity of the plug when the plug is disposed in closed-valve position.

10. A plug valve as set forth in claim 9, wherein the venting means is located in one end of the valve plug.

11. A plug valve comprising in combination, a valve body having inlet and outlet ports and an intermediate transverse plug receptive bore in communication with said ports, a deformable non-metallic sleeve in said bore having upper and lower annular bearing faces interiorly thereof, said sleeve being capable of being deformed under fluid pressure when in use by the accumulation of fluid between the sleeve and valve body, said sleeve having opposed apertures therein registering one with each body port, and solid areas in the sides of the sleeve intermediate the sleeve apertures, a valve plug rotatable in the sleeve and having upper and lower annular faces in fluid-tight sliding contact upon the bearing faces of the sleeve, the plug having a through cavity and a communicating vent formed therein, the through cavity being registerable with the sleeve apertures and the body ports upon rotation of the plug to open-valve position, and the vent being so located in the plug as to provide fluid pressure in said plug cavity substantially equal to the fluid pressure acting on the outer surface of said sleeve when the valve is closed, and clearance spaces provided between the solid areas of the sleeve and the adjacent wall of the plug receptive bore.

References Cited in the file of this patent

UNITED STATES PATENTS

| | | |
|---|---|---|
| 512,892 | Munger | Jan. 16, 1894 |
| 1,400,647 | Westinghouse | Dec. 20, 1921 |
| 1,409,691 | Farmer | Mar. 14, 1922 |
| 2,728,550 | Sinkler | Dec. 27, 1955 |
| 2,911,187 | Owsley | Nov. 3, 1959 |
| 2,930,576 | Sanctuary | Mar. 29, 1960 |
| 2,987,295 | Schenck | June 6, 1961 |